(12) United States Patent
Li et al.

(10) Patent No.: US 11,158,037 B2
(45) Date of Patent: Oct. 26, 2021

(54) METHOD AND APPARATUS FOR CHECKING INTEGRITY OF DEVICE SELECTION PROCESS

(71) Applicants: Jinghui Li, Sierra Madre, CA (US); Honggan Zhu, Shenzhen (CN); Yaxing Yao, Shenzhen (CN)

(72) Inventors: Jinghui Li, Sierra Madre, CA (US); Honggan Zhu, Shenzhen (CN); Yaxing Yao, Shenzhen (CN)

(73) Assignee: Auyora (Shenzhen) Inc., Shenzhen (CN)

( * ) Notice: Subject to any disclaimer, the term of this patent is extended or adjusted under 35 U.S.C. 154(b) by 280 days.

(21) Appl. No.: 16/520,791

(22) Filed: Jul. 24, 2019

(65) Prior Publication Data

US 2020/0327656 A1 Oct. 15, 2020

(51) Int. Cl.
*G06T 7/00* (2017.01)
*H04N 5/225* (2006.01)
*G06T 7/70* (2017.01)
*G02B 5/26* (2006.01)

(52) U.S. Cl.
CPC ............. *G06T 7/0004* (2013.01); *G02B 5/26* (2013.01); *G06T 7/70* (2017.01); *H04N 5/2256* (2013.01)

(58) Field of Classification Search
CPC .................................................. G06T 7/0004
USPC ........................................................... 348/92
See application file for complete search history.

(56) References Cited

U.S. PATENT DOCUMENTS

2020/0394599 A1* 12/2020 Akatsuka ........... G06K 9/00671

* cited by examiner

*Primary Examiner* — Daniel T Tekle

(57) ABSTRACT

Embodiments of present invention provide a method for checking integrity of a device selection process. The method includes placing multiple devices in a device tray that has multiple cells arranged in a matrix of M-rows and N-columns; separating the multiple devices into a first group and a second group; causing a machine to memorize locations of at least the first group; removing the second group from the device tray; after the removing, causing the machine to capture an image of devices remaining in the device tray and identify locations of the remaining devices based upon the image; comparing locations so identified with locations of the first group of devices memorized by the machine; and taking a corrective action when a discrepancy is found between the locations identified and locations memorized. An apparatus for performing the above method is also provided.

18 Claims, 5 Drawing Sheets

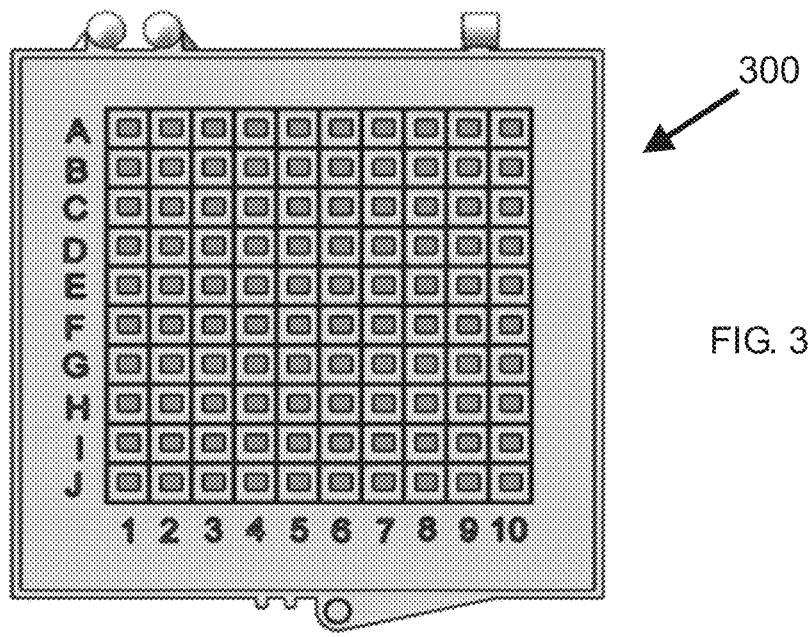

FIG. 3

| | 1 | 2 | 3 | 4 | 5 | 6 | 7 | 8 | 9 | 10 |
|---|---|---|---|---|---|---|---|---|---|---|
| A | Fail | Pass | Pass | Pass | Pass | Fail | Pass | Fail | Fail | Pass |
| B | Pass | Pass | Pass | Pass | Pass | Pass | Pass | Fail | Pass | Pass |
| C | Pass | Fail | Pass | Pass | Pass | Fail | Fail | Pass | Pass | Fail |
| D | Pass | Pass | Pass | Pass | Fail | Pass | Fail | Pass | Fail | Fail |
| E | Fail | Pass | Fail | Pass | Pass | Pass | Pass | Pass | Pass | Fail |
| F | Fail | Pass | Pass | Fail | Pass | Pass | Pass | Pass | Pass | Pass |
| G | Pass | Pass | Pass | Pass | Pass | Pass | Pass | Fail | Pass | Pass |
| H | Pass | Pass | Pass | Fail | Pass | Fail | Pass | Pass | Pass | Pass |
| I | Pass | Pass | Pass | Fail | Fail | Pass | Pass | Pass | Fail | Pass |
| J | Pass | Pass | Pass | Pass | Pass | Pass | Pass | Pass | Fail | Fail |

FIG. 4

METHOD AND APPARATUS FOR CHECKING INTEGRITY OF DEVICE SELECTION PROCESS

CROSS REFERENCE To RELATED APPLICATION

The present application claims benefit of priority to a Chinese patent application S/N: 201910287050.5, filed Apr. 11, 2019 with the China National intellectual Property Administration, the content of which is incorporated herein by reference in its entirety.

FIELD OF THE INVENTION

The present invention relates to the field of optical device and optical component for fiber communication. In particular, it relates to a method of checking and verifying integrity of a selection process of optical devices that is based upon machine-vision or image, and machine or apparatus for performing the same.

BACKGROUND

Optical communication system uses various active and passive optical components and devices. Some of these optical components and devices are often manufactured in mass quantity and, after being manufactured, subject to a vigorous quality inspection process. Upon inspection, devices with sufficiently high quality meeting a set of minimum performance specification may be selected, in a follow-up device selection process, and separated from devices that are deemed as low quality and/or otherwise failing to meet a minimum performance requirement. Thin-film filters (TFF), for example, are one of these optical devices that are subject to this inspection and selection process.

In order to improve efficiency of this inspection and selection process, thin-film filters are usually grouped and processed in batches of large quantity such as 100, 200, or even more. A batch of thin-film filters, for example 100, may first be placed in a device tray. The device tray may then be placed on an optical inspection platform such as an inspection machine, apparatus, or station. In performing inspection, light may be applied or directed to surfaces of the thin-film filters and some of the light may subsequently get reflected back from the surfaces of the thin-film filters. After detection of the reflected light, quality of the thin-film filters may be determined by analyzing optical spectrum of the reflected light. Some of the thin-film filters, such as a handful, may be found to have spectral characteristics that are not desirable and have failed the quality inspection. These thin-film filters are considered as having a "fail" quality and need to be discarded. These "fail" quality devices are selected or picked out of the device tray and separated from those that otherwise have passed the quality inspection to have a "pass" quality. In an alternative fashion, thin-film filters that pass the quality inspection may be selected or picked out of the device tray, which will then leave only those that fail the quality inspection in the device tray.

The above device selection or pick-up process (to separate "pass" grade/quality devices from "fail" grade/quality devices) is largely carried out manually and sometimes by a machine. In either situation, unfortunately mistake or error happens. For example, in a process of picking or selecting thin-film filters of "fail" quality from the device tray, thin-film filters of "pass" quality may be accidentally removed or picked up and one or more of "fail" quality may be left behind un-picked. Likewise, when picking or selecting thin-film filters of "pass" quality from the device tray, thin-film filters of "fail" quality may be accidentally picked up or removed, and one or more of "pass" quality may be left behind un-picked. As a consequence, this could result in either an increase in overall manufacturing cost (in the case that "pass" quality devices are left behind unpicked and thus discarded and/or wasted or ultimate failure of optical equipments that are assembled using thin-film filters of "fail" quality that may be accidentally picked up during the inspection process, and thus mistakenly used as having "pass" quality.

SUMMARY

Embodiments of present invention provide a method for checking integrity of a device selection process. The method includes placing a plurality of devices in a device tray, the device tray having a plurality of cells arranged in a matrix of M-rows and N-columns (M-by-N), each cell being able to hold one of the plurality of devices; separating the plurality of devices into a first group of devices and a second group of devices, causing a machine to memorize locations of at least the first group of devices in the device tray; removing the second group of devices from the device tray; after the removing, causing the machine to capture an image of devices remaining in the device tray and identify locations of the remaining devices based upon the image; comparing locations identified of the remaining devices with locations of the first group of devices memorized by the machine; and taking a corrective action when a discrepancy is found between the locations identified and the locations memorized by the machine.

In one embodiment, causing the machine to capture an image of devices remaining in the device tray includes illuminating the devices by one or more light sources, the light sources include at least one white light and multiple single-color lights including at least a red, a blue, and a green light.

In another embodiment, causing the machine to capture an image of devices remaining in the device tray includes adjusting distances of the one or more light sources from the device tray and brightness of light from the one or more light sources such that, based on the captured image, the machine is able to identify locations of the remaining devices in the device tray. In one embodiment, the light sources include at least a ring-shaped light source and a coaxial light source.

According to one embodiment, taking the corrective action includes retrieving a device that is removed from a cell of the device tray in a location that is memorized by the machine as a location for one of the first group of devices.

According to another embodiment, taking the corrective action includes removing a remaining device from a cell of the device tray in a location that is identified as a location for one of the second group of devices.

In one embodiment, the plurality of devices is a plurality of thin-film filters and the second group of devices are thin-film filters whose optical properties have passed a quality inspection, with such optical properties being obtained by laser-scanning surfaces of the thin-film filters and detecting laser light reflected back from the surfaces. In another embodiment, both M and N equal at least 10.

BRIEF DESCRIPTION OF THE DRAWINGS

The present invention will be understood and appreciated more fully from the following detailed description of embodiments of the invention, taken in conjunction with accompanying drawings of which:

FIG. 3 is a demonstrative illustration of a machine-vision of a device tray that holds a full tray of devices in its cells in accordance with one embodiment of present invention;

FIG. 4 is a demonstrative illustration of spectrum-based decision indicating devices, as being held in the cells of device tray illustrated in FIG. 3, that either pass or fail quality test;

Figure 1:
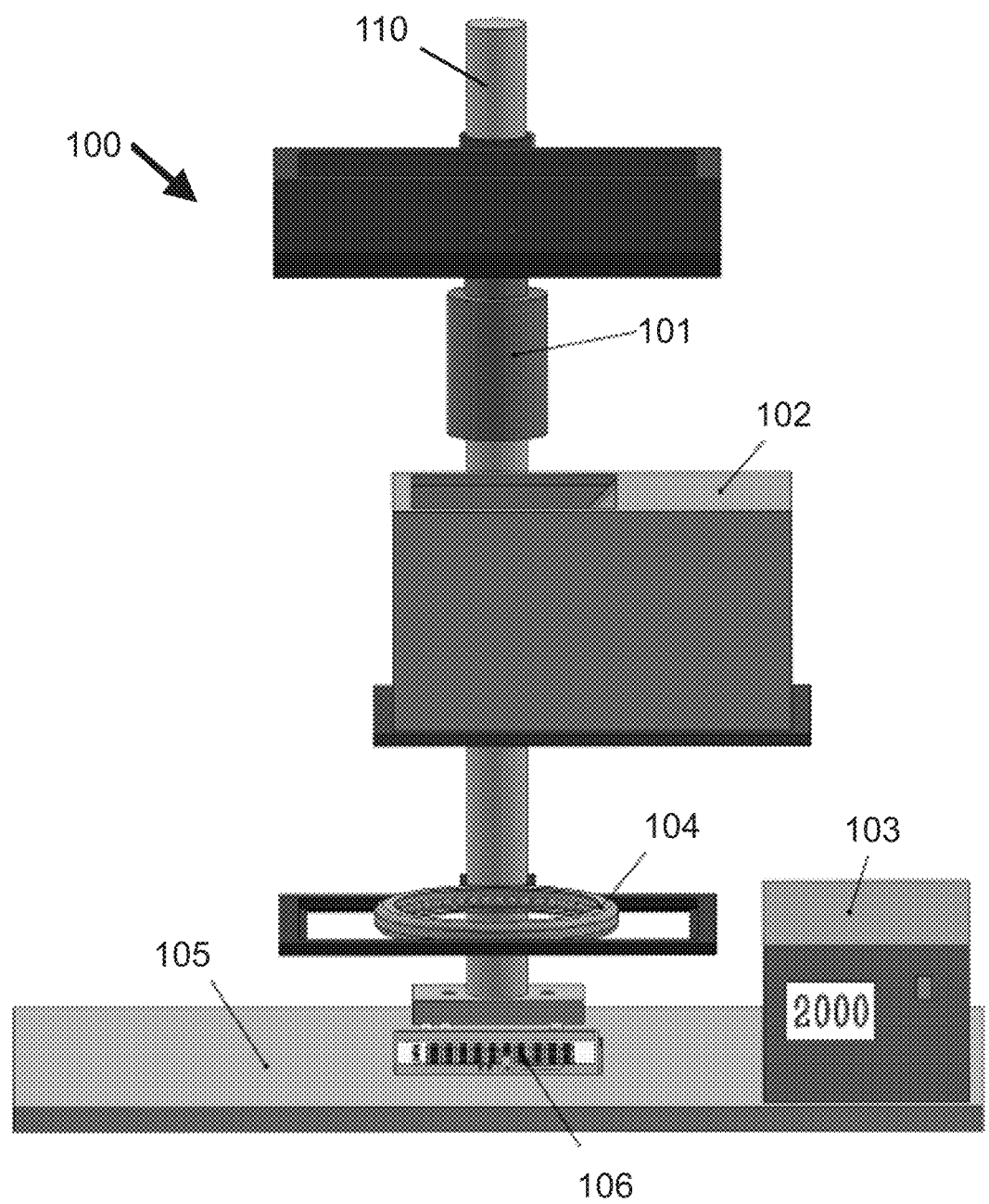
FIG. 1 is a demonstrative illustration of front view of an apparatus for performing machine-vision based integrity checking of a device selection process in accordance with one embodiment of the present invention.

It will be appreciated that for simplicity and clarity purpose, elements shown in the drawings have not necessarily been drawn to scale. Further, in various functional block diagrams, two connected devices and/or elements may not necessarily be illustrated as being connected. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

Embodiments of present invention provide a method, and apparatus associated therewith, for checking integrity of a device selection process, in particular checking integrity of a process of selecting thin-film filters. The method of process checking may be conducted based upon a machine generated vision or image ("machine-vision") with very few human intervention, which may be automated as well, thereby improving the efficiency of overall manufacturing process.

Because optical devices, in particular thin-film filters, usually have a high selectivity in terms of reflection of light, embodiment of present invention provides a machine or apparatus that employs a combination of light sources, such as a coaxial light source and a ring-shaped light source, to enable and enhance the select-ability of reflection of light. In addition, each of the light sources, coaxial or ring-shaped, may have a white light and/or a combination of some single-color lights that includes, at least, a red light, a blue light, and a green light. A light source controller or controlling system may be used to control height/distance and orientation of the coaxial light and ring-shaped light from the target object. Adjustment of the light sources during operation may be performed manually by an operator or by a machine that may have been trained in the past and through machine learning process to be an automatic or at least semi-automatic machine.

An image capturing system of the apparatus may capture images, with sufficient clarity and contrast, of devices left in the device tray after a device selection process. The image may be used in a subsequent process of checking and making determination of integrity of the device selection process that had resulted in the selected devices remaining in the device tray. Embodiments of present invention further provide a method of operating or using the machine or apparatus in performing the integrity checking or verification of device selection process.

In general, device trays are used to hold devices such as thin-film filters for quality inspection after their manufacturing. According to one embodiment, a device tray may have a plurality of cells arranged in a matrix array of M-rows and N-columns (M-by-N) with each cell being able to hold one, and at most one, device such as thin-film filter. The device tray may be fully populated with devices, although embodiment of present invention is not limited in this respect and in one embodiment some cells may be left empty, not being populated with any devices. Subsequently, optical properties of the devices may be tested through, for example, laser scanning or other optical means. Based upon the testing results, the devices or thin-film filters may be categorized and separated into a first group (e.g., a group of "fail" quality) and a second group (e.g., a group of "pass" quality). One group of devices, for example, the second group of "pass" quality, may then be selected, picked up, or removed manually or through the use of a machine from device tray thereby to be separated from the other group.

In order to check or verify whether devices that are supposed to be removed from the device tray (based on the above quality determination) were not removed and/or devices that are supposed to remain in the device tray were accidentally and/or unintentionally removed, and thereupon taking corrective action if necessary, embodiments of present invention provide a method, and an apparatus or machine associated therewith for performing the same, of checking integrity of above device removal or selection process.

Figure 2:
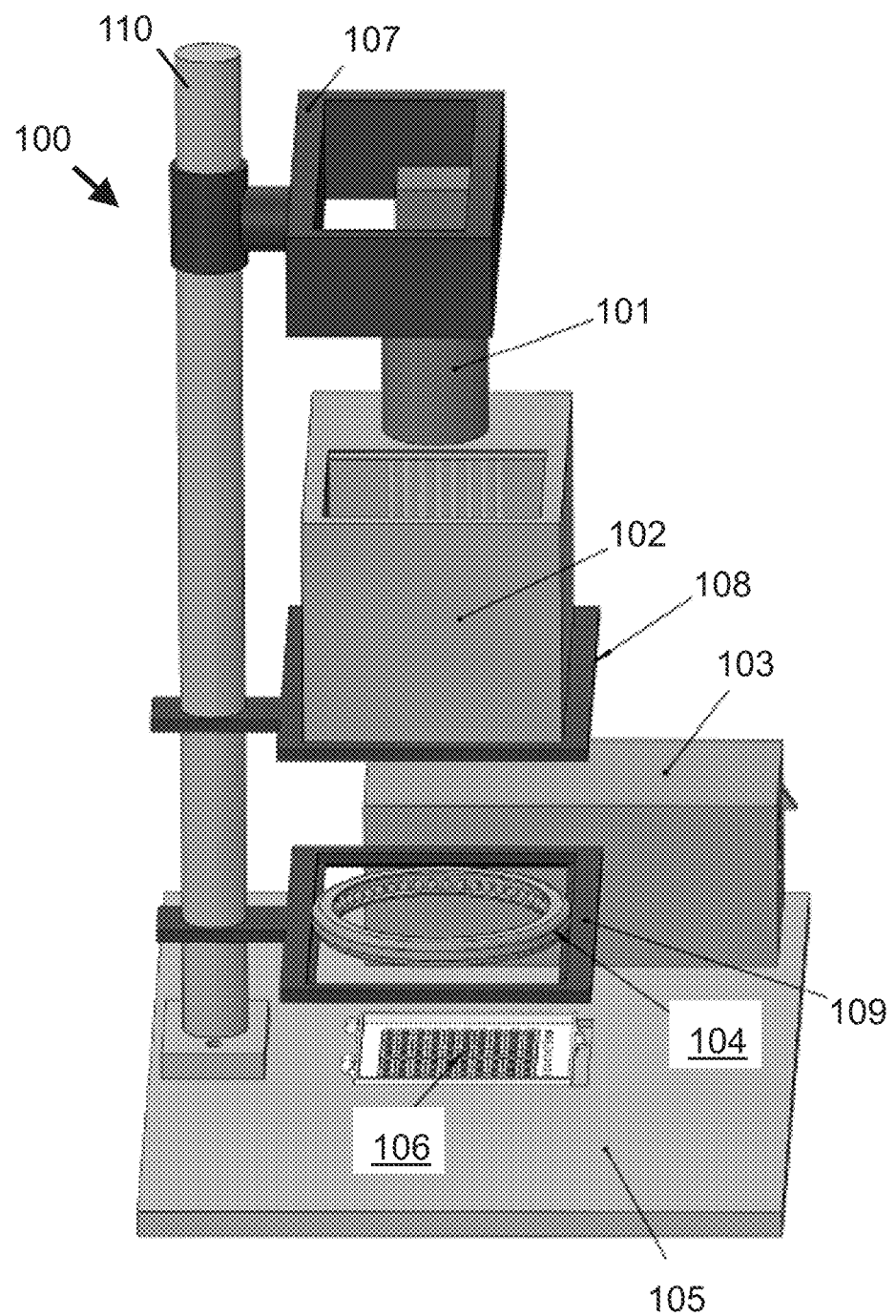
FIG. 2 is a demonstrative illustration of side view of the apparatus illustrated in FIG. 1.

FIG. 1 and FIG. 2 are demonstrative illustration of respective front and side views of an apparatus or machine 100 that may be used in performing integrity check of a device selection process, based on machine-image or machine-vision, according to one embodiment of present invention. More specifically, as being illustrated in FIGS. 1 and 2, apparatus 100 may include, inter alia, an image capturing system 101, a coaxial light source or illumination system 102, a ring-shaped annular light source or illumination system 104, and a light source controller or controlling system 103. Image capturing system 101 may include, e.g., a digital camera and one or more high-definition lenses, preferably industrial grade lenses. Controlling system 103 may control light sources 102 and 104. Controlling system 103 may be a computing device and/or a software driven controlling system as well.

Image capturing system 101 may be or include a camera 101. Camera 101 maybe a digital camera whose operation, together with movement of the high-definition lenses associated therewith, may be controlled by a user manually or via a computer keyboard, a joystick, one or more buttons, one or more switches, and/or any other electronic input/output means. A device tray 106 containing a group of devices left thereupon after a preceding device selection process, may be placed or loaded onto platform 105, directly underneath ring-shaped light source 104, coaxial light source 102, and image capturing system 101. Images of the group of devices may be captured by camera 101, displayed in a monitoring screen (not shown) for the user to view and act upon, and maybe digitally processed by a computing device or processor connected to camera 101 such as controlling system 103. For example, a captured image, in particular image of relative locations of the group of devices remaining in device tray 106 may be processed and compared with their expected locations, whose information may be stored or memorized in or by the computing device during a previous quality inspection process. Based upon the comparison, decision may be made as to whether integrity of the previously performed device selection process is preserved or not, as being described below in more details.

Coaxial light source 102 may provide a first illumination to the devices held in device tray 106, in an up-and-down fashion of substantially vertical direction. Ring-shaped light source 104 may provide a second illumination to the same devices and device tray, in an angled direction, to the normal of the surface of device tray 106. Additionally, this second illumination may be adjustable horizontally along a 360-degree circle.

According to one embodiment, there are supporting members 107, 108, and 109 that provide physical support to camera 101, coaxial light source 102, and ring-shaped light source 104, respectively, as being demonstratively illustrated in FIG. 2. Supporting members 107, 108, and 109 may also be made to rotate along a vertical post 110, and may be adjusted up and down along post 110 to adjust distances among themselves and their distance from device tray 106 to provide extra adjustment capability. During operation, the machine or apparatus maybe trained to perform such adjustment automatically or alternatively the adjustment may be made manually to ensure adequate illumination of the devices such that image of devices held in cells of device tray 106 may be captured ("machine image" or "machine-vision") with sufficient clarity and/or contrast such as those, for example, illustrated in FIGS. 5 and 6. For example, the light source controller 103 may perform the rotation and height or distance adjustment of the light sources.

According to one embodiment, coaxial light source 102 and ring-shaped light source 104 may independently include one white light source, and one or more single-color light sources that include at least a red light, a blue light, and a green light. Brightness of illumination of the light from light sources 102 and 104, the switch or selection of use between light sources 102 and 104, the use of either white light or a mixture of one or more single-color lights may be controlled by light source controller 103 which in-turn is controlled or driven by a computing device. The computing device may be part of controlling system or controller 103 and/or may reside separately outside light source controller 103.

FIG. 3 is a demonstrative illustration of a machine-image or machine-vision of a device tray that are fully populated in its cells with devices, such as thin-film filters, in accordance with one embodiment of present invention. More specifically, FIG. 3 illustrates a device tray 300, which may be made of, for example, silicone material or other translucent or transparent material, the use of which enhances the system's ability to capture device images with better clarity and contrast. In one embodiment, device tray 300 may be a substantially flat-shaped container and in a rectangular shape. Device tray 300 may include individual cells that are arranged in a matrix of M-rows and N-columns (M-by-N). Here, M and N may be any integer number. Preferably, both M and N may equal to or be larger than 10. For example, as being demonstratively illustrated in FIG. 3, both M and N equal to 10 and device tray 300 may include 100 individual cells arranged in a 10-by-10 matrix. Each individual cell may hold one, and only one, individual device such as one thin-film filter. In FIG. 3, each row of cells may be marked or denoted by an alphabetic character A, B, C, D, E, F, G, H, I, and J and each column of cells may be marked or denoted by a numerical number 1, 2, 3, 4, 5, 6, 7, 8, 9, and 10 such that each individual cell in device tray 300 may be addressed by a combination of its corresponding alphabetic character and numerical number such as B3, D10, etc.

According to one embodiment, in addition to height or distance of light sources 102 and 104 from device tray 106, as being described above, use of either white light or a combination of one or more single-color lights; the brightness of illumination of the lights may be adjusted manually or controlled by the controller or computing device 103 such that an image captured by camera 101 may provide sufficient contrast or clarity. The captured image may be used, through processing, for the purpose of identifying locations of cells of device tray 106 where there are devices such as thin-film filters, or the absence thereof. For example, the small dark rectangular shape inside each cell represents a thin-film filter, with the cell being illustrated in FIG. 3 as a set of grid of 10-by-10 in size. In FIG. 3, device tray 300 is illustrated as being fully populated by thin-film filters, thus each "grid" in FIG. 3 is illustrated with a small dark rectangular shape. When there is no device or thin-film filter in a cell or a number of cells, the cell or cells are illustrated to contain no such dark rectangular shape (see FIGS. 5 and 6).

Optical devices such as thin-film filters are usually made in a mass production. After manufacturing, the devices are subjected to a quality inspection and/or testing and those that pass the inspection may be selected or separated from those that fail the inspection. To perform the inspection, the devices as manufactured may be placed in a device tray such as device tray 300 illustrated in FIG. 3. A laser-based scanning process, for example, may be applied to the surface of the devices. Lights that pass through or get reflected back from the devices under-test may be detected or received and the spectrum of the lights, which are associated with and reflect optical properties of the devices, may be analyzed. When a device passes its inspection, spectrum received from that "pass" quality device generally falls within a certain range of pre-determined spectrum patterns. On the other hand, spectrum of a "fail" quality device that fails its inspection may not match or be close to any of the pre-determined spectrum patterns. In a device tray of for example 10-by-10 in size, it is possible that not all of the 100 devices in the device tray will pass their quality inspection. A non-limiting example is described below in more details.

FIG. 4 is a demonstrative illustration of spectrum-based device inspection results which demonstratively denotes devices that pass the inspection with the word "pass" and those that fail the inspection with the word "fail". This device matrix may correspond to those illustrated in device tray 300 in FIG. 3. After the inspection, embodiments of the present invention provide a machine or apparatus that is caused to memorize this pass/fail inspection results map such that the map may be used later for comparison with cell locations obtained for devices remaining in the device tray 300 after performing a device selection and/or removal process. Normally, devices that successfully pass the quality inspection may be removed from device tray 300 either manually or by a machine. However, embodiment of present invention is not limited in this respect, and in some embodiment, devices that fail the inspection may be removed instead. Hereinafter, for the ease of description without losing its generality, it is assumed that devices that pass the inspection are removed or supposed to be removed from device tray 300.

Figure 5:
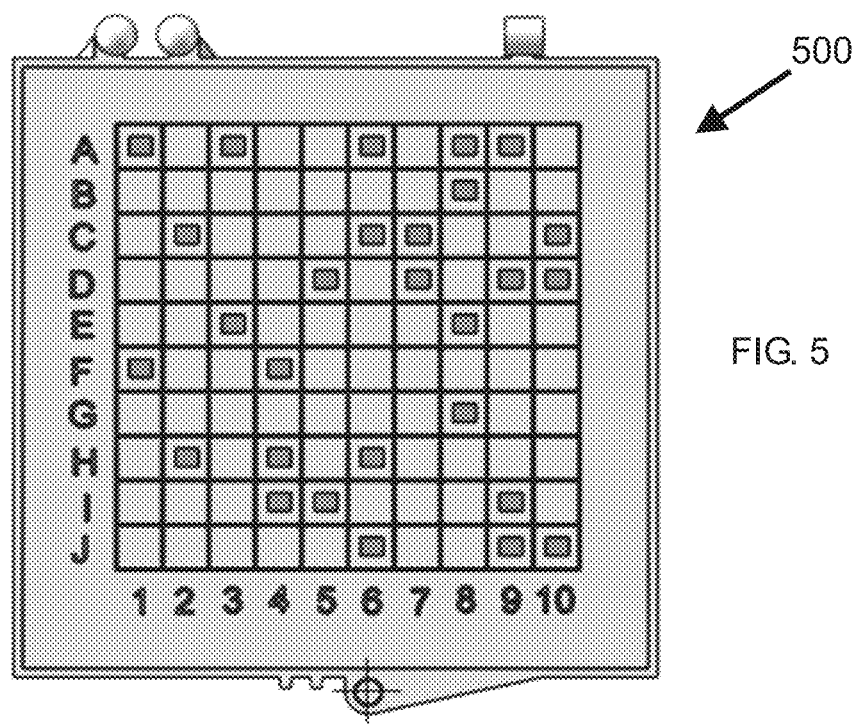
FIG. 5 is a demonstrative illustration of a machine-vision after only devices of pass quality, as illustrated in FIG. 4, are successfully removed from the device tray in accordance with one embodiment of present invention.

FIG. 5 is a demonstrative illustration of a machine image or machine-vision of a device tray 500, corresponding to device tray 300 in FIG. 3, after only those devices that have passed the quality inspection (marked as "pass" in FIG. 4) are supposedly removed from device tray 500. However, in reality and factory operation, the process of selecting, removing, or picking devices that have successfully passed the quality inspection from device tray 300 are prone to involve human errors or mistakes made by a machine depending upon whether the selection process is made manually or performed by a machine. For example, a device that passed the inspection to have a "pass" grade or status may be left in the device tray un-picked. Likewise, a device that failed the inspection to have a "fail" grade or status may be accidentally, mistakenly, or unintentionally picked up by the device selection process.

Figure 6:
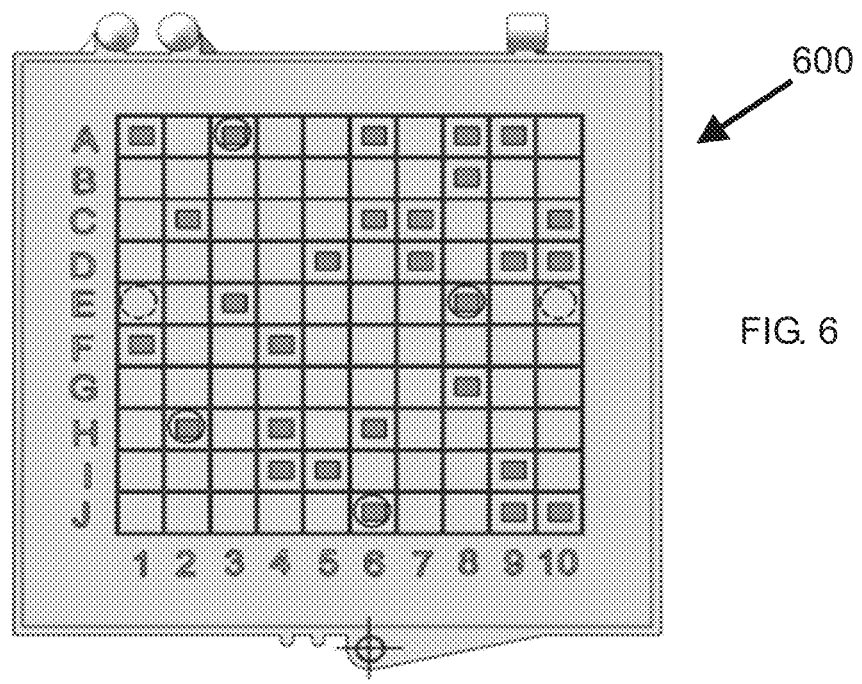
FIG. 6 is a demonstrative illustration of a machine-vision after supposedly only devices of pass quality, as illustrated in FIG. 4, were removed from the device tray but had some mistakes during the removal process.

FIG. 6 is a demonstrative illustration of a machine-image or machine-vision after supposedly only devices with a "pass" status were picked up or removed from the device tray 600 but instead, as highlighted by the circles, some mistakes happened during the removal process. For example, devices at locations of A3, E8, and J6 are "pass" quality or grade devices but were left in the device tray un-picked. On the other hand, devices at locations of E1 and E10 are "fail" quality or grade devices but were picked up or removed nevertheless during the selection process.

In view of the above, embodiment of present invention provides a method, together with a machine or apparatus as being described above with reference to FIGS. 1 and 2, for checking or verifying the integrity of the device selection process. The method is described below in more details.

Figure 7:
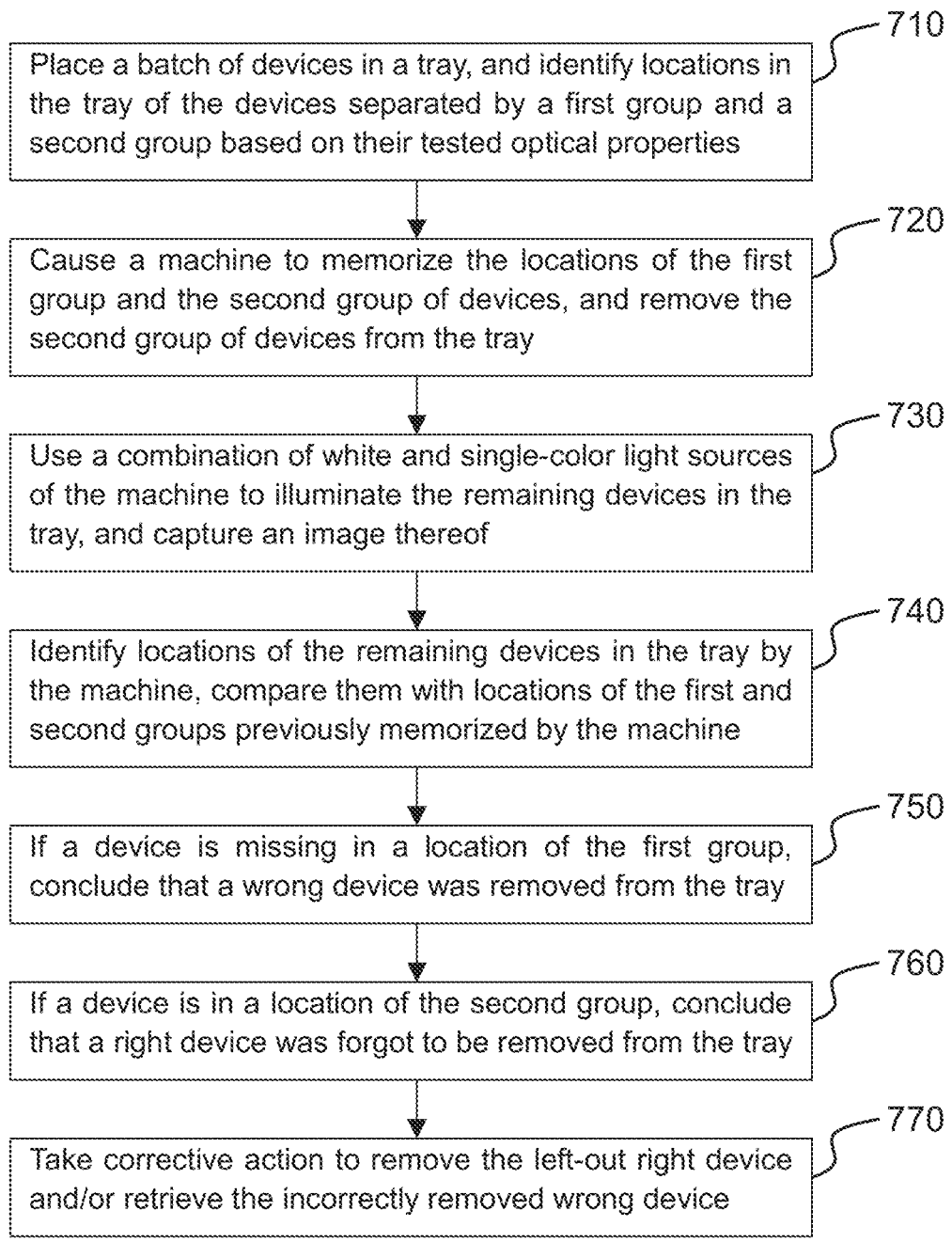
FIG. 7 is a demonstrative illustration of flowchart of a method for performing integrity checking of a device selection process in accordance with one embodiment of present invention.

FIG. 7 is a demonstrative illustration of flowchart of a method for performing integrity checking of a device selection process in accordance with one embodiment of present invention. More specifically, the method includes, for example, placing a batch or a plurality of devices in a device tray and identifying locations of individual devices that are distinguished by their tested optical properties by a first group and a second group (710). For example, the batch of devices may include multiple devices, such as 100 devices, that may fully populate all of the cells of the device tray, although embodiment of present invention is not limited in this respect and the cells may not be fully populated by the devices in some embodiment. The devices may be previously tested, such as by using laser scanning and/or other optical testing means, for their optical properties. Based on the test results the devices may have been given either a "pass" or a "fail" status (see FIG. 4) or considered as having a "pass" or "fail" quality. For the purpose of below discussion, devices of "fail" quality are considered as with a first group and devices of "pass" quality are considered as with a second group.

Embodiments of present invention provide a machine or apparatus, as being described above, that may be caused to memorize locations of the first and second groups of devices (720). Such locations may be coordinates of the matrix cells of device tray, which may be represented, for example, by "A3", "B9" . . . etc. The method of embodiment of present invention may include subsequently removing one group of devices, such as the second group, from the device tray. For example, in practice, devices of "pass" quality are generally removed. However, embodiment of present invention is not limited in this respect and devices of "fail" quality, instead of devices of "pass" quality, may be removed as well.

In one embodiment, the method may include applying a combination of white light and/or one or more single-color lights to illuminate the remaining devices in the device tray (730). The machine or apparatus may adjust the brightness of illumination of the light sources, and their respective distances from the device tray, until presence of the remaining devices in the device tray becomes clearly visible through a vision or image generated by and captured through a camera of the apparatus or machine. The adjustment may be done manually or automatically through training of the apparatus. From the captured vision or image of the remaining devices, the method further includes identifying locations of cells of the device tray where the remaining devices reside, and comparing these identified locations with those locations previously stored or memorized for the first group (or second group) of devices (740), depending upon which group of devices are removed. The method then proceeds to check the integrity of the device removal or selection process as being described below in more details.

Ideally, all of the devices that have a "pass" quality should have been removed from the device tray successfully, leaving only those devices with a "fail" quality remaining on the device tray. However, in reality, error or mistake may happen when the removal process is performed manually by a human and/or even by a machine that is trained to perform such a device removal or selection process. This may result in a device tray with remaining devices whose vision or image captured by the camera may be similar to that illustrated in FIG. 5. By comparing the device locations in FIG. 5 with the pass/fail status map of devices in FIG. 4, the integrity of the device selection process may be checked or verified as being described below in more details.

According to one embodiment, the method of present invention may proceed to identify whether there is any devices that may be incorrectly removed or picked up during the device selection process. If a device is missing in a location of the first group, as are illustrated in location E1 and E10 in FIG. 6, a conclusion may be made that devices with the wrong optical properties or wrong group may have been removed from the device tray (750). On the other hand, if a device is found to be in a location of the second group, as those illustrated in location A3, E8, H2, and J6 in FIG. 6, a conclusion may be made that one or more devices that are supposed to be removed may have been left in the device tray un-picked (760). Based on the previous steps of 750 and 760, the method further includes a step of taking corrective action to remove the left-out devices that need to be removed, and/or to retrieve or find those devices that were incorrectly removed from the tray (770).

According to a further embodiment of present invention, when all of the cells of the tray are populated by devices that are subsequently separated into first and second groups of "pass" or "fail" quality or status, only locations of one group, either the group of "pass" quality or the group of "fail" quality, may need to be memorized by the machine or apparatus. This is because locations of the remaining cells will be locations of the other group of devices.

While certain features of the invention have been illustrated and described herein, many modifications, substitutions, changes, and equivalents will now occur to those of ordinary skill in the art. Such changes, modifications, and/or alternative embodiments may be made without departing from the spirit of present invention, and are hereby all considered within the scope of present invention. It is, therefore, to be understood that the appended claims are intended to cover all such modifications and changes as fall within the spirit of the invention.

What is claimed is:

1. A method for checking integrity of a device selection process, comprising:

placing a plurality of devices in a device tray, said device tray having a plurality of cells arranged in a matrix of M-rows and N-columns (M-by-N), each cell being able to hold one of said plurality of devices;

separating said plurality of devices into a first group of devices and a second group of devices, causing a machine to memorize locations of at least said first group of devices in said device tray;

removing said second group of devices from said device tray;

after said removing, causing said machine to capture an image of devices remaining in said device tray and identify locations of said remaining devices based upon said image;

comparing locations identified of said remaining devices with locations of said first group of devices memorized by said machine; and taking a corrective action when a discrepancy is found between said locations identified and said locations memorized by said machine, wherein taking said corrective action comprises removing a remaining device from a cell of said device tray in a location that is identified as a location for one of said second group of devices.

2. The method of claim 1, wherein causing said machine to capture an image of devices remaining in said device tray comprises illuminating said devices by one or more light sources, said light sources comprise at least one white light and multiple single-color lights including at least a red, a blue, and a green light.

3. The method of claim 2, wherein causing said machine to capture an image of devices remaining in said device tray comprises adjusting distances of said one or more light sources from said device tray and brightness of light from said one or more light sources such that, based on said captured image, said machine is able to identify locations of said remaining devices in said device tray.

4. The method of claim 3, wherein said light sources comprise at least a ring-shaped light source and a coaxial light source.

5. The method of claim 1, wherein taking said corrective action comprises retrieving a device that is removed from a cell of said device tray in a location that is memorized by said machine as a location for one of said first group of devices.

6. The method of claim 1, wherein said plurality of devices is a plurality of thin-film filters and said second group of devices are thin-film filters whose optical properties have passed a quality inspection, with such optical properties being obtained by laser-scanning surfaces of said thin-film filters and detecting laser light reflected back from said surfaces.

7. The method of claim 1, wherein said M and N both are at least equal to 10.

8. A method comprising:

providing a device tray, said device tray having a plurality of cells arranged in a matrix of M-rows and N-columns (M-by-N), each cell holding one of a plurality of thin-film filters;

identifying a subset of said cells and causing an apparatus to memorize locations thereof in said device tray, said subset of said cells holding a sub-group of said plurality of thin-film filters, said sub-group of thin-film filters are thin-film filters whose optical properties have failed a quality inspection;

removing rest of said thin-film filters from cells outside said subset of said cells;

after said removing, causing said apparatus to capture an image of said thin-film filters remaining in said cells and identify locations thereof based on said image;

comparing locations identified of said remaining devices with locations memorized by said apparatus for said subset of said cells; and taking a corrective action when said apparatus finds a discrepancy between said location identified and said locations memorized.

9. The method of claim 8, wherein causing said apparatus to capture an image of said thin-film filters comprises illuminating said thin-film filters using one or more light sources, said light sources comprise single-color light sources that include at least a red light, a blue light, and a green light.

10. The method of claim 8, wherein taking said corrective action comprises retrieving a removed thin-film filter that was taken away from a location when the location is memorized by said apparatus for a cell of said subset of said cells, and/or removing a remaining thin-film filter from a location when the location is for a cell outside said subset of said cells.

11. The method of claim 8, wherein said M equals 10 and said N equals 10.

12. A method for checking integrity of a device selection process, comprising:

placing a plurality of devices in a device tray, said device tray having a plurality of cells arranged in a matrix of M-rows and N-columns (M-by-N), each cell being able to hold one of said plurality of devices;

separating said plurality of devices into a first group of devices and a second group of devices, causing a machine to memorize locations of at least said first group of devices in said device tray;

removing said second group of devices from said device tray;

after said removing, causing said machine to capture an image of devices remaining in said device tray and identify locations of said remaining devices based upon said image;

comparing locations identified of said remaining devices with locations of said first group of devices memorized by said machine; and taking a corrective action when a discrepancy is found between said locations identified and said locations memorized by said machine, wherein taking said corrective action comprises retrieving a device that is removed from a cell of said device tray in a location that is memorized by said machine as a location for one of said first group of devices.

13. The method of claim 12, wherein causing said machine to capture an image of devices remaining in said device tray comprises illuminating said devices by one or more light sources, said light sources comprise at least one white light and multiple single-color lights including at least a red, a blue, and a green light.

14. The method of claim 13, wherein causing said machine to capture an image of devices remaining in said device tray comprises adjusting distances of said one or more light sources from said device tray and brightness of light from said one or more light sources such that, based on said captured image, said machine is able to identify locations of said remaining devices in said device tray.

15. The method of claim 14, wherein said light sources comprise at least a ring-shaped light source and a coaxial light source.

16. The method of claim 12, wherein taking said corrective action comprises removing a remaining device from a cell of said device tray in a location that is identified as a location for one of said second group of devices.

17. The method of claim 12, wherein said plurality of devices is a plurality of thin-film filters and said second group of devices are thin-film filters whose optical properties have passed a quality inspection, with such optical properties being obtained by laser-scanning surfaces of said thin-film filters and detecting laser light reflected back from said surfaces.

18. The method of claim 12, wherein said M and N both are at least equal to 10.

* * * * *